US009711247B2

(12) United States Patent
Kim et al.

(10) Patent No.: US 9,711,247 B2
(45) Date of Patent: Jul. 18, 2017

(54) VOLOXIDIZER WITH DOUBLE REACTOR FOR SPENT FUEL RODS DECLADDING AND DOUBLE REACTOR FOR USE IN THE SAME

(71) Applicant: Korea Atomic Energy Research Institute, Daejeon (KR)

(72) Inventors: Young-Hwan Kim, Daejeon (KR); Jae-Won Lee, Daejeon (KR); Geun-il Park, Daejeon (KR); In-Tae Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 14/585,032

(22) Filed: Dec. 29, 2014

(65) Prior Publication Data
US 2016/0042821 A1     Feb. 11, 2016

(30) Foreign Application Priority Data
Aug. 8, 2014  (KR) .................. 10-2014-0102485

(51) Int. Cl.
*G21C 19/44*     (2006.01)
*G21C 19/42*     (2006.01)

(52) U.S. Cl.
CPC .............. *G21C 19/42* (2013.01); *G21C 19/44* (2013.01); *Y02W 30/882* (2015.05)

(58) Field of Classification Search
None
See application file for complete search history.

(56) References Cited

U.S. PATENT DOCUMENTS

| 4,459,140 A * | 7/1984 | Kuban ................. B01D 46/008 55/356 |
| 2007/0110640 A1* | 5/2007 | Kim ...................... G21C 19/48 422/159 |

(Continued)

FOREIGN PATENT DOCUMENTS

| JP | 2001-141877 A | 5/2001 |
| KR | 10-2004-0070863 A | 8/2004 |

(Continued)

OTHER PUBLICATIONS

Lee et al., "Thermal granulation of U3O8 powder using a rotaryvoloxidizer."*

(Continued)

*Primary Examiner* — Sean P Burke
(74) *Attorney, Agent, or Firm* — Knobbe Martens Olson & Bear LLP (57) ABSTRACT

A voloxidizer with a double reactor for spent fuel rods decladding of the present invention includes a reactor module into which spent fuel rods are loaded, the reactor module including a reactor having a dual structure; a heater module for heating the reactor module; and a drive module for providing a driving force to the reactor module. A double reactor utilized in a voloxidizer for spent fuel rods decladding includes an internal reactor into which spent fuel rods are loaded; and an external reactor formed on an outer circumferential surface of the internal reactor. Here, a first transport part and a second transport part are formed on inside surfaces of the internal reactor and the external reactor, respectively, and the spent fuel rods are moved by the first transport part and the second transport part and oxidized when the internal reactor and the external reactor are rotated.

11 Claims, 13 Drawing Sheets

(56) References Cited

U.S. PATENT DOCUMENTS

2011/0250108 A1* 10/2011 Collins .................. C01B 21/36
                                                    423/18
2012/0051978 A1* 3/2012 Kim ...................... G21C 19/44
                                                    422/159

FOREIGN PATENT DOCUMENTS

| KR | 10-0662085 B1 | 12/2006 |
| KR | 10-2009-0070955 A | 7/2009 |
| KR | 10-1031489 B1 | 4/2011 |

OTHER PUBLICATIONS

Kim et al., "Engineering Design of a High-Capacity Vol-Oxidizer for Handling UO2 Pellets of Tens of Kilogram".*
Kim et al., "Design of Remotely Operated Vol-oxidizer for Hot-cell Application".*
Spencer et al., "Description of a Full-Scale Experimental Voloxidizer Facility." ORNL-5924.*
Office Action dated May 14, 2015 of corresponding Korean Patent Application No. 10-2014-0102485—4 pages.

* cited by examiner

VOLOXIDIZER WITH DOUBLE REACTOR FOR SPENT FUEL RODS DECLADDING AND DOUBLE REACTOR FOR USE IN THE SAME

CROSS-REFERENCE TO RELATED APPLICATION

This application claims the benefit of Korean Patent Application No. 10-2014-0102485 filed on Aug. 8, 2014 in the Korean Intellectual Property Office, the disclosure of which is incorporated herein by reference.

BACKGROUND

1. Field

The present disclosure relates to a voloxidizer for processing spent fuel rods.

2. Description of the Related Art

Nuclear fuel means substances loaded into a nuclear reactor and generating available energy through continuous nuclear fission and spent fuel rods means residual substances obtained after nuclear fission.

According to a conventional method, a nuclear fuel assembly which is burnt up in a nuclear power plant is not treated any longer and is kept/stored in a water tank. However, as an operating hour of nuclear power plant is increased, the amount of spent fuel rods is gradually accumulated so that a huge storage space is required. In addition, the necessity and riskiness of disposing waste materials accumulated as above has been continuously pointed out.

Therefore, recycling the solid type spent fuel rods is proposed as disclosed in Korean Patent No. 10-0662085 (published on Dec. 20, 2006).

SUMMARY

An aspect of the present invention is to provide a voloxidizer with a double reactor for spent fuel rods decladding and a double reactor for use, which increase a separation and collection ratio of hulls and pellets, can form stable oxide powders, and reflects a remote operability in a hot cell.

The task to be solved is not limited to the task mentioned above, and another task to be solved which is not mentioned above may be apparently understood by one skilled in the art through the above detail description.

One aspect provides a voloxidizer with a double reactor for spent fuel rods decladding according to one embodiment of the present invention includes a reactor module into which spent fuel rods are loaded, the reactor module including a reactor having a dual structure; a heater module for heating the reactor module; and a drive module for providing a driving force to the reactor module.

A double reactor utilized in a voloxidizer with a double reaction for spent fuel rods decladding according to another embodiment of the present invention includes an internal reactor into which spent fuel rods are loaded; and an external reactor formed on an outer circumferential surface of the internal reactor, wherein a first transport part and a second transport part are formed on inside surfaces of the internal reactor and the external reactor, respectively, and the spent fuel rods are moved by the first transport part and the second transport part and oxidized when the internal reactor and the external reactor are rotated.

DETAILED DESCRIPTION

Hereinafter, embodiments of the present invention are described with reference to the accompanying drawings.

For recycling the solid type spent fuel rods, in an example method, an apparatus for pulverizes the spent fuel rods, oxidizes the powders, and transfers the oxidized powders to a subsequent process. Since hulls and pellets are mixed together in a reactor, a typical oxidizer for oxidizing the spent fuel rods requires an additional separation system for increasing a collection ratio. A typical mesh type oxidizer for the spent fuel rods is disadvantageous in that since powders passing through a mesh are got out of a heater zone, unstable oxide powers are foamed.

Figure 1:
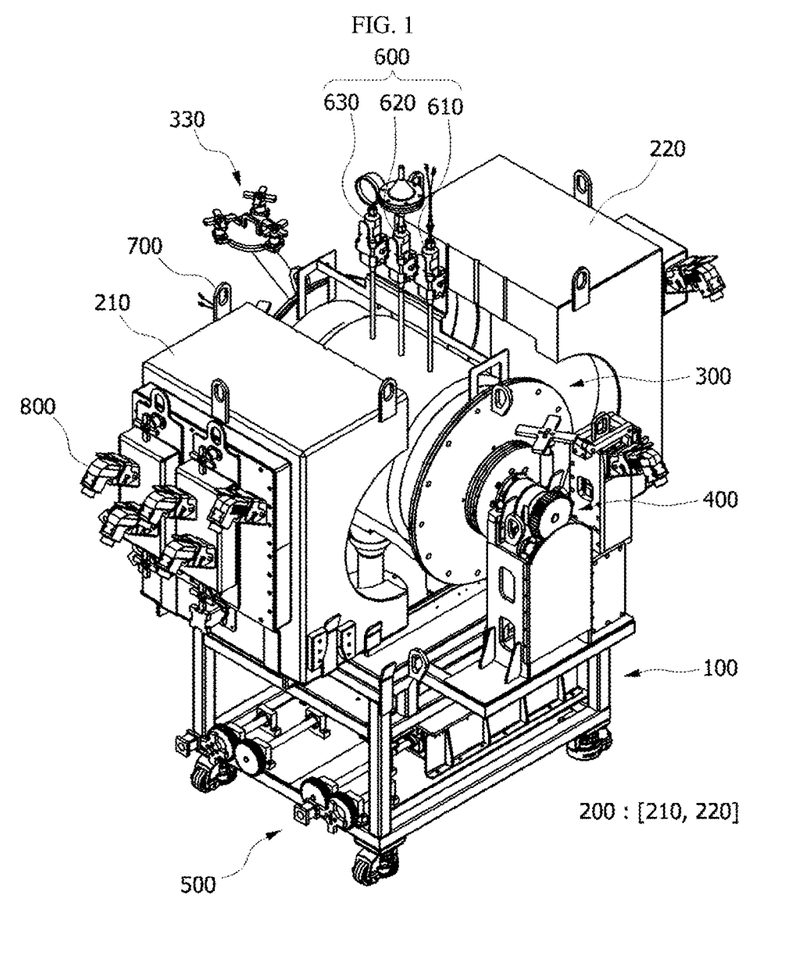
FIG. 1 is a perspective view of a voloxidizer with a double reactor for spent fuel rods decladding according to an embodiment of the present invention.
Figure 2:
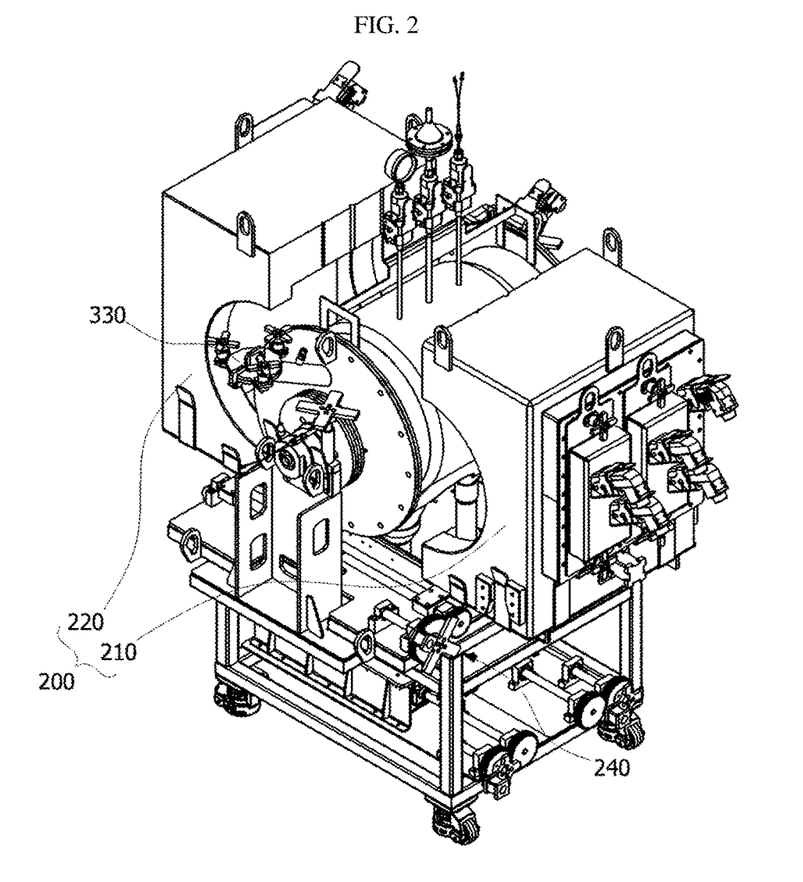
FIG. 2 is another perspective view of a voloxidizer with a double reactor for spent fuel rods decladding according to an embodiment of the present invention.

In embodiments of the invention, first of all, FIG. 1 and FIG. 2 are perspective views for illustrating a voloxidizer with a double reactor for spent fuel rods decladding, and the voloxidizer with the double reactor for spent fuel rods decladding includes a support module 100 to which a plurality of frames are connected, a heater module 200 seated on the support module 100, a reactor module 300 heated by the heater module 200. Here, spent fuel rods are loaded into the reactor module 300.

In addition, the voloxidizer with the double reactor for spent fuel rods decladding further includes an utility module 600 mounted to the reactor module 300 for adjusting an internal state of the reactor module 300, a drive module 400 providing the reactor module 300 with a driving force, and a vessel module 500 for collecting the spent fuel rods oxidized in and discharged from the reactor module 300.

Since a plurality of clamped rings 700 to which a handling tool (not shown) such as a crane can be coupled are mounted to each module, the above modules can be easily separated from each other or assembled to each other by means of the handling tool and it is possible to perform a remote operation and a remote maintenance.

The heater module 200 and the drive module 400 are provided with a plurality connectors 800, and wires (not shown) for supplying electric power to the heater module 200 and the drive module 400 and signal cables (not shown) for controlling the heater module 200 and the drive module 400 are coupled to and decoupled from the connectors 800.

Figure 3:
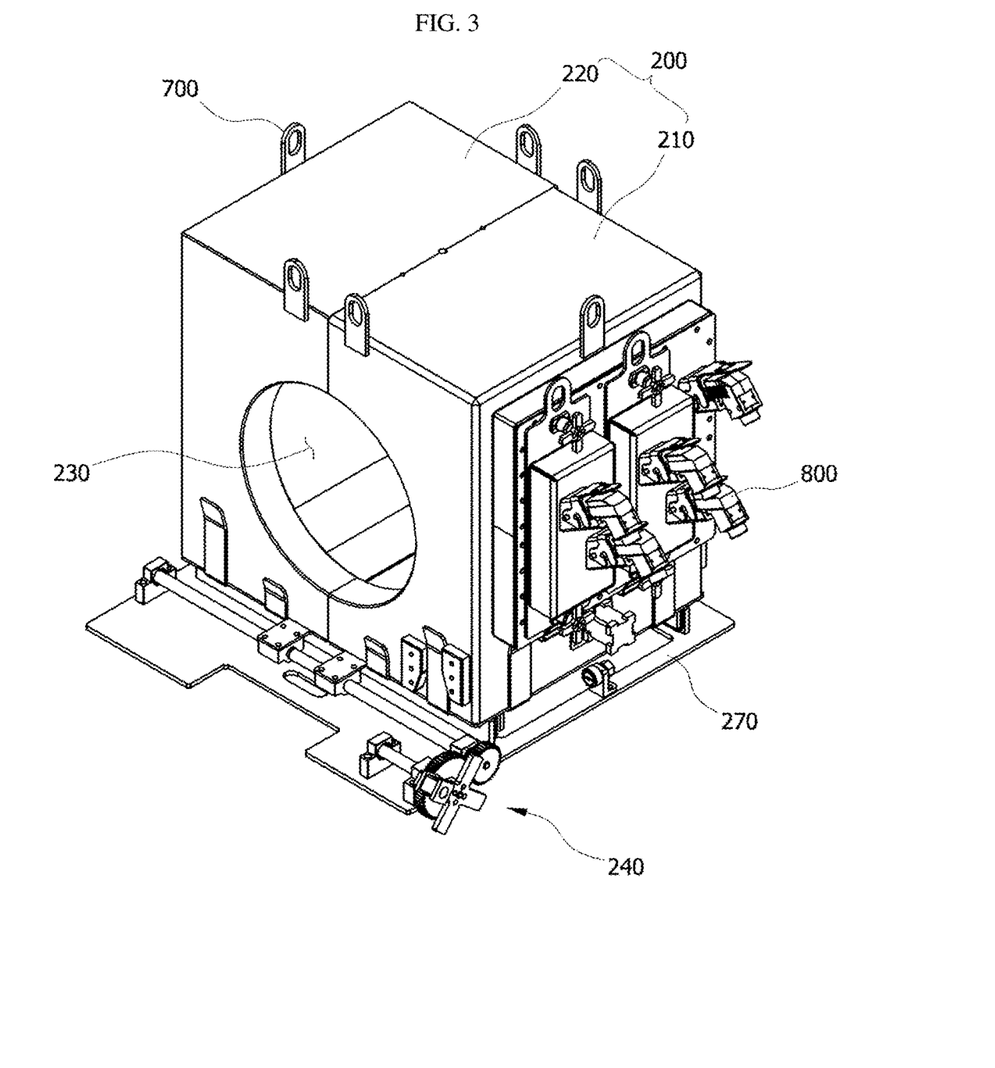
FIG. 3 is a perspective view of a heater module in a voloxidizer with a double reactor for spent fuel rods decladding according to an embodiment of the present invention.
Figure 4:
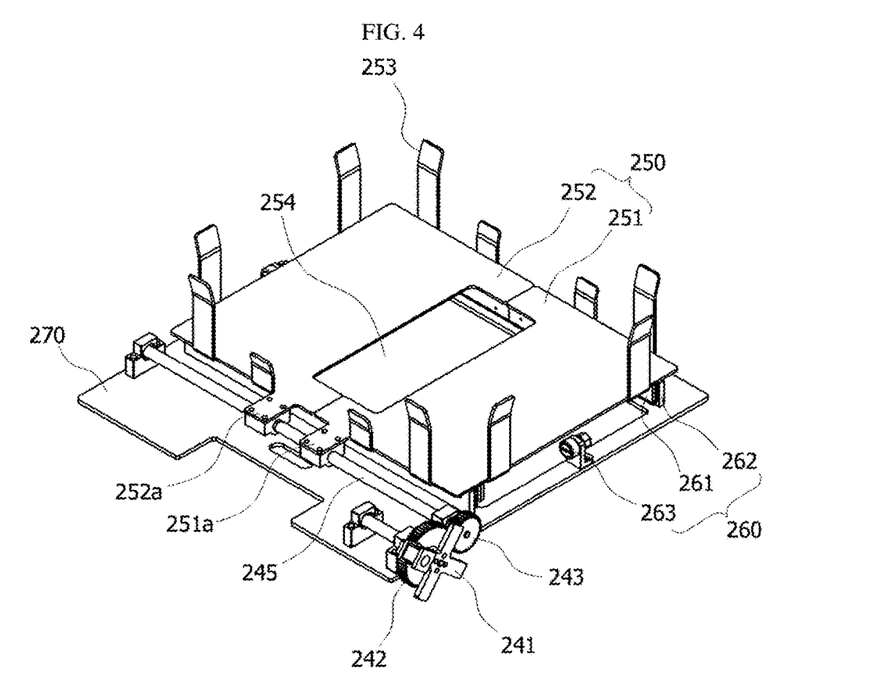
FIG. 4 is a perspective view of a heater module seating plate in a voloxidizer with a double reactor for spent fuel rods decladding according to an embodiment of the present invention.
Figure 5:
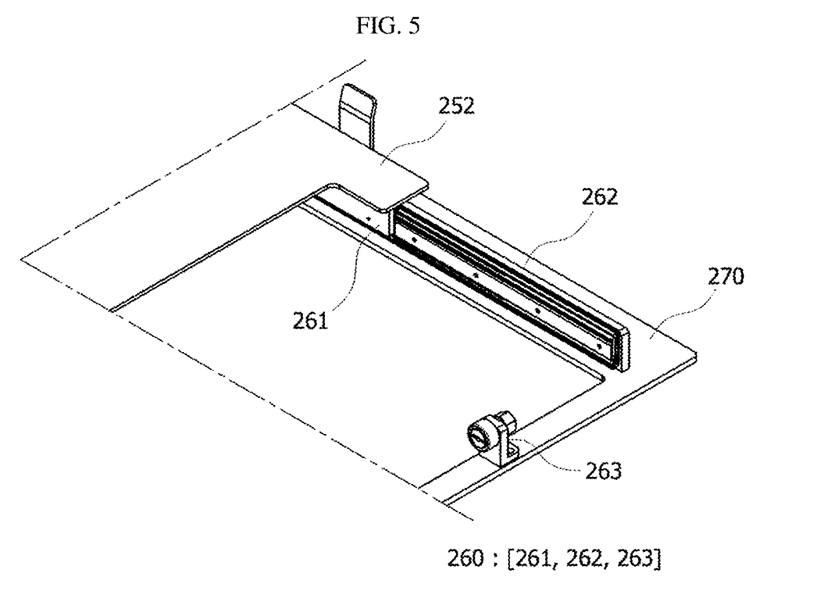
FIG. 5 is a perspective view of a heating body guide part in a voloxidizer with a double reactor for spent fuel rods decladding according to an embodiment of the present invention.

FIG. 3 to FIG. 5 are perspective views for illustrating the heater module 200 in the voloxidizer with the double reactor for spent fuel rods decladding according to an embodiment of the present invention, and the heater module 200 is configured to heat the reactor module 300 to 500 to 800° C. for oxidizing the spent fuel rods. In order to perform the above function and to prevent a shape from being largely changed at a high temperature, it is preferable that the heater module 200 be formed of a material having a low thermal expansion coefficient.

The heater module 200 includes a first heating body 210 and a second heating body 220, and the first heating body 210 and the second heating body 220 have side walls concaved to an inside to enable the reactor module 300 to be received therein as shown in FIG. 1 and FIG. 2.

Therefore, the heater module 200 has a shape in which the reactor module 300 is surrounded, and if the first heating body 210 and the second heating body 220 are slid, the first heating body 210 and the second heating body 220 are coupled to each other in a state where the reactor module 300 is interposed between the two heating bodies and the reactor module 300 is placed in a reactor module through hole 230 formed in the heater module 200.

The heater module 200 is placed on a heating body seating plate 250, and the heating body seating plate 250 is composed of a first heating body seating plate 251 on which the first heating body 210 is placed and a second heating body seating plate 252 on which the second heating body 220 is placed.

Here, a plurality supporting pieces 253 are formed on a circumference of the heating body seating plate 250 for securing and supporting the heating bodies 210 and 220, and a discharge part through hole 254 through which a discharge part 340 of a reactor 320 (which will be described later) passes is formed at a central portion of the heating body seating plate 250.

The heater module 200 is slid by a heating body moving part 240 and a heating body guide part 260, and the heating body moving part 240 is composed of a first rotary knob 241, a first driving gear 242, a first driven gear 243, and a first drive shaft 245 connected to the first driven gear 243.

The first drive shaft 245 is connected to first drive shaft connection parts 251a and 252a formed at one side of the heating body seating plate 250.

The heating body guide part 260 includes a first sliding plate 261 connected to a lower side of the heating body seating plate 250 in parallel with the first drive shaft 245 and a first sliding guide 262 for guiding the first sliding plate 261.

In addition, the first sliding guide 262 is connected to a heating body support plate 270 having an opening formed at a central portion thereof, and transfer rollers 263 are provided at both sides of the heating body support plate 270 to allow the heating bodies 210 and 220 to be smoothly slid.

In other words, the heating body seating plate 250 is slid by the heating body moving part 240 along the heating body guide part 260, and the heating bodies 210 and 220 are coupled to each other at both sides of the reactor module 300.

As shown in FIG. 2, therefore, in a case in which the reactor module 300 is mounted or decoupled, the first heating body 210 and the second heating body 220 are slid in the opposite directions with respect to a center of the heater module 200, and this sliding is obtained by opposite movements of the first heating body seating plate 251 and the second heating body seating plate 252.

Figure 6:
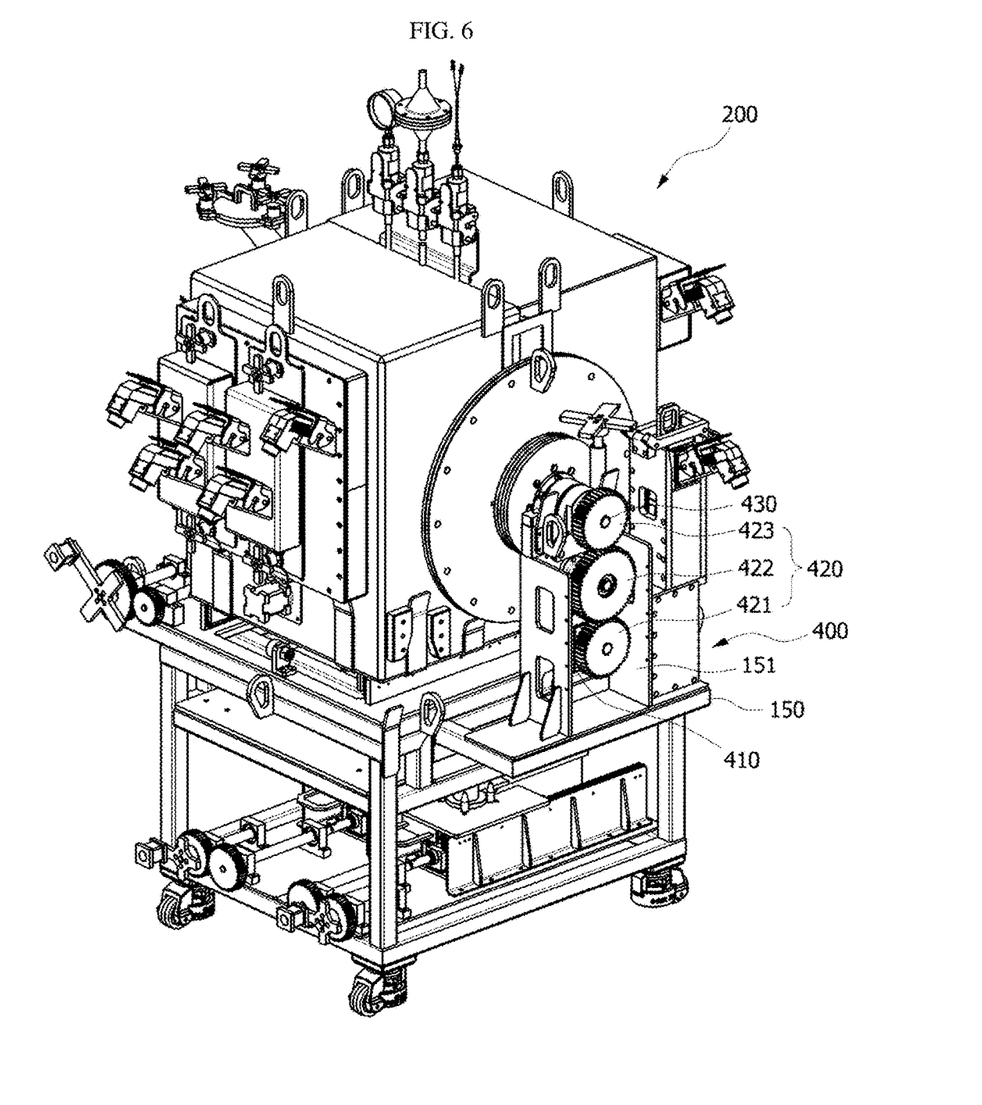
FIG. 6 is a perspective view of a drive module in a voloxidizer with a double reactor for spent fuel rods decladding according to an embodiment of the present invention.

FIG. 6 is a perspective view for illustrating the drive module 400 in the voloxidizer with the double reactor for spent fuel rods decladding according to an embodiment of the present invention.

The drive module 400 includes a motor 410, a rotary shaft 430 passing through the reactor module 300, and a power transmission part 420 for transmitting a driving force of the motor 410 to the reactor module 300.

The power transmission part 420 includes an input part 421 mounted to the motor 410, a delivery part 422 geared with the input part 421, and an output part 423 geared with delivery part 422 and mounted to the rotary shaft 430.

Therefore, the motor 410 is operated, a driving force is transmitted to the rotary shaft 430 via the power transmission part 420, and the rotary shaft 430 is rotated so that the reactor 320 placed in the reactor module 300 is rotated.

In the power transmission part 420, here, the input part 421, the delivery part 422, and the output part 423 are sequentially and vertically stacked in the direction of gravity. This configuration is devised to prevent a damage of teeth which may occur due to an expansion of the output part 423 mounted to the rotary shaft 430 caused by a high temperature in the reactor module 300 which will be described later.

Figure 7:
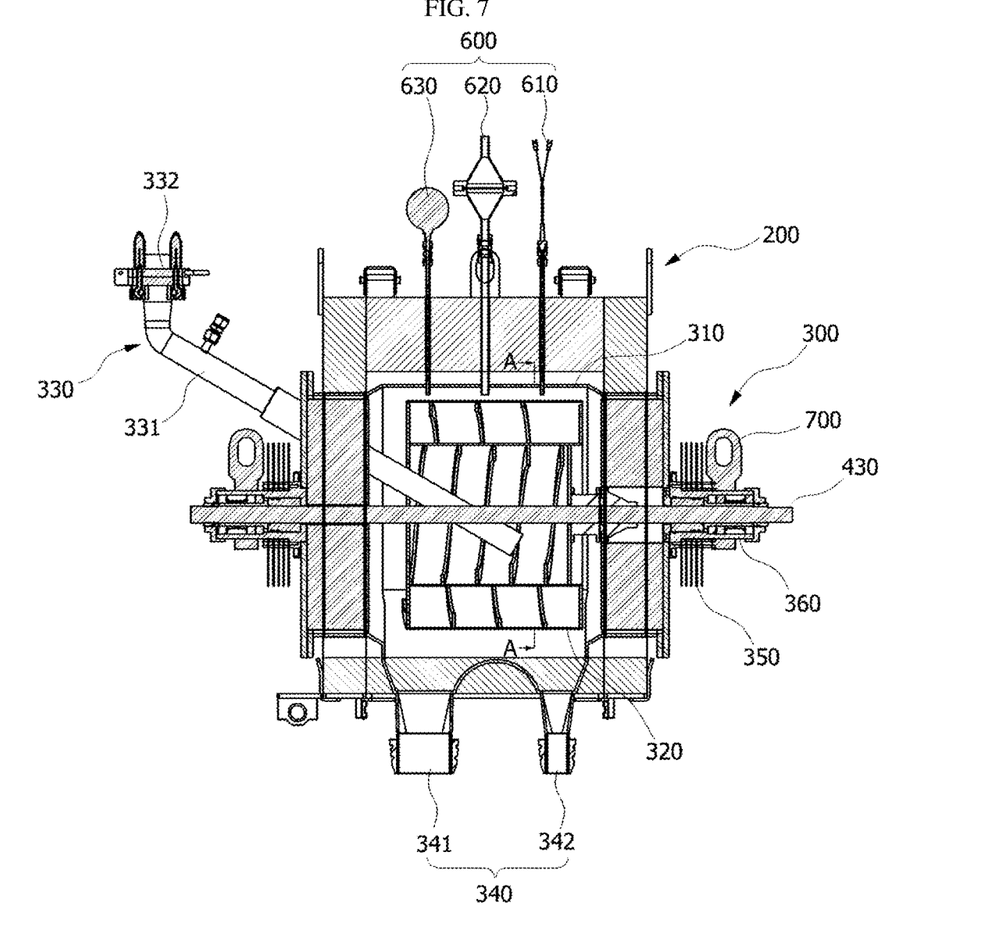
FIG. 7 is a schematic sectional view of a voloxidizer with a double reactor for spent fuel rods decladding according to an embodiment of the present invention.
Figure 8:
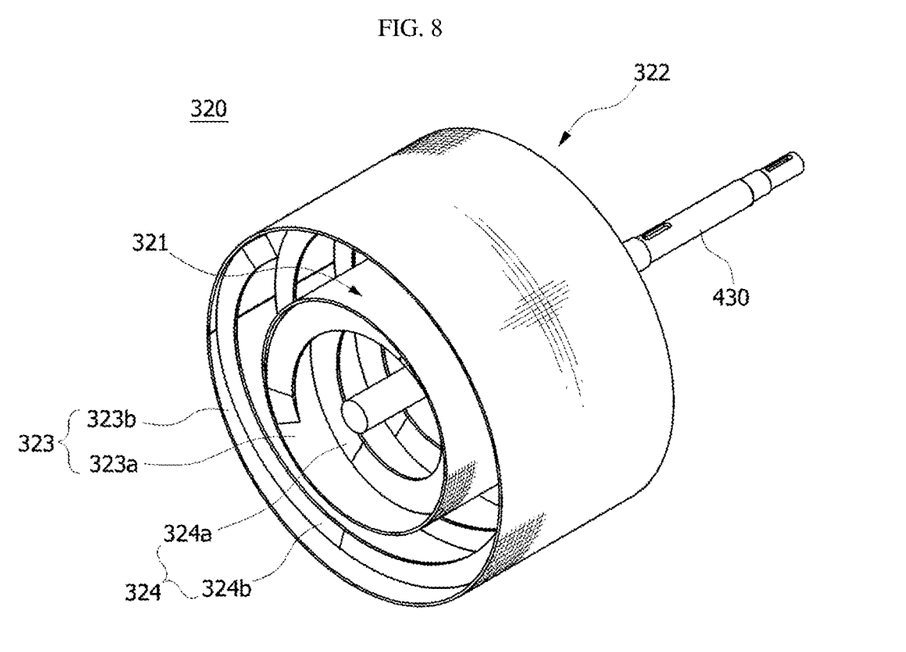
FIG. 8 is a cross-sectional view taken along the line A-A in FIG. 7.
Figure 9:
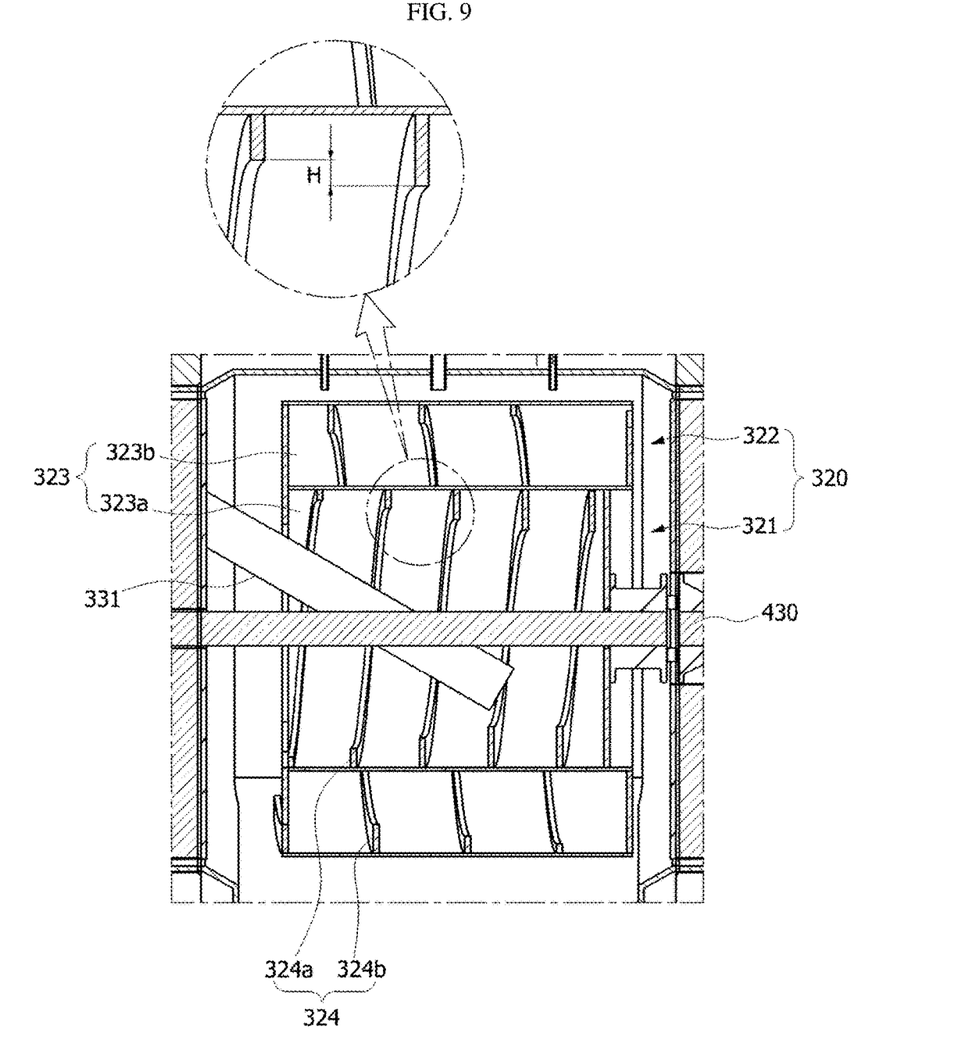
FIG. 9 is a partial enlarged view of FIG. 7.

FIG. 7 to FIG. 9 are sectional views for illustrating the reactor module 300 and the utility module 600 in the voloxidizer with the double reactor for spent fuel rods decladding according to an embodiment of the present invention.

The reactor module 300 includes a cylindrical body 310, the reactor 320 placed in the body 310, and an input part 330 passing through the body 310 and the reactor 320. Here, an oxidation reaction of the spent fuel rods occurs in the reactor 320.

In addition, the reactor 320 includes an internal reactor 321 into which the spent fuel rods are loaded and an external reactor 322 surrounding the internal reactor 321, and the input part 330 is composed of an input tube 331 acting as a passage through which the spent fuel rods are loaded from an outside into the internal reactor 321 and a stopper 332 mounted to the input tube 331.

And, the spent fuel rods loaded in the reactor 320 is divided into hulls and pellets through an oxidation process, and the discharge part 340 is formed on the body 310 for discharging the hulls and pellets.

The reactor 320 has a cylindrical shape and is surrounded with a mesh 323. Also, a plurality of transport parts 324 having a spiral screw shape are formed on an inner circumferential surface of the reactor 320.

The rotary shaft 430 passes through the reactor 320, the reactor is rotated by an operation of the drive module 400, and the spent fuel rods loaded in the reactor 320 are divided into hulls and pellets through the oxidation process performed for 16 hours.

Here, a screw blade of a first transport part 324a of the internal reactor 321 is inclined in a direction which is opposite to the direction in which a screw blade of a second transport part 324b of the external reactor 322 is inclined. In this structure, once the reactor 320 is rotated, the spent fuel rods are moved from the other end to one end in the internal reactor 321 and are moved from one end to the other end in the external reactor 322 by the transport part 324.

Once the spent fuel rods are moved by the transport part 324, the spent fuel rods may be concentrated in the direction in which the spent fuel rods are moved. In particular, if the spent fuel rods are concentrated in one end portion of the external reactor 322, there is a risk that the spent fuel rods may overflow into the internal reactor 321 through an internal mesh 323a.

In order to prevent the above risk, a step portion may be formed on some screw blades of the transport part 324 to prevent the spent fuel rods from being concentrated.

In the first transport part 324a, therefore, some screw blades adjacent to one end of the internal reactor 321 have step portions formed thereon, respectively, and when the reactor 320 is rotated in a clockwise direction, a height of the screw blade is decreased by a predetermined value H along the direction in which the spent fuel rods received in the internal reactor 321 are moved.

In the second transport part 324b, in addition, some screw blades adjacent to the other end of the external reactor 322 have step portions formed thereon, respectively, and when the reactor 320 is rotated in a counterclockwise direction, a height of the screw blade is decreased by the predetermined value H along the direction in which the spent fuel rods received in the external reactor 322 are moved.

In other words, some of screw blades of the first transport part 324a, which are adjacent to the input part 330, have the step portion formed thereon and a height of the screw blade is gradually reduced by the predetermined value H towards the input part 330. Also, some of screw blades of the second transport part 324b, which are adjacent to the drive module 400, have the step portion formed thereon and a height of the screw blade is gradually reduced by the predetermined value H towards the drive module 400.

And, during the oxidation process performed in the reactor 320, the reactor 320 is normally rotated in the clockwise direction for 8 hours, and the spent fuel rods loaded in the internal reactor 321 are moved toward the input part 330 by the first transport part 324a and are oxidized.

At this time, the spent fuel rods in the internal reactor 321 are moved to the external reactor 322 through the internal mesh 323a by gravity and are fully oxidized in the external reactor 322. Then, once the reactor 320 is reversely rotated in the counterclockwise direction for 8 hours, the oxidized spent fuel rods are moved toward the drive module 400 and divided into pellets and hulls.

In other words, when the reactor is normally rotated in the clockwise direction, the spent fuel rods are moved to one end of the internal reactor 321 and are subjected to the oxidation. While the spent fuel rods are being moved toward the one end, the spent fuel rods do not pass through the internal mesh 323a. However, the spent fuel rods moved to the one end of the internal reactor 321 pass through the internal mesh 323a and are finally moved to the external reactor 322 by gravity.

And, when the reactor is reversely rotated in the counterclockwise direction, the spent fuel rods moved to the external reactor 322 are moved to the other end of the external reactor 322 and are fully oxidized to be divided into pellets and hulls.

Each spent fuel rod is divided into hulls and pellets after performing the oxidation process, hulls and pellets are moved to a hull discharge part 342 and a pellet discharge part 341 constituting the discharge part 340, respectively, and are then collected to a vessel 520 which will be described later. Therefore, the oxidation process for the spent fuel rods is completed.

In the reactor module 300, heatsinks 350 are provided at both sides of the body 310 for radiating heat in the body 310 to an outside, and sealing parts 360 are provided at both sides of the body 310 for preventing a high temperature gas in the body 310 from leaking to an outside.

The utility module 600 is connected to the reactor module 300 to adjust a state of the reactor module 300, and this utility module 600 includes a thermocouple part 610, a gas removal part 620, and an oxidizer supply part 630.

Two thermocouple parts 610 are employed in an embodiment of the present invention, portions of thermocouple parts 610 pass through an upper portion and one side portion of the body 310 of the reactor module 300, respectively. Therefore, it is possible to verify an internal temperature of the reactor module 300 through the thermocouple parts 610.

One end portion of each of the gas removal part 620 and the oxidizer supply part 630 is connected to an inner space of the body 310 of the reactor module and the other end portion is exposed to an outside. The gas removal part 620 removes a volatile gas such as krypton (Kr), cesium (Cs), iodine, technetium (Tc), ruthenium (Ru), tritium (H-3), and the like which are in the form of gas and generated from the spent fuel rods during the oxidation process performed at a high temperature.

The oxidizer supply part 630 provides a passage for supplying an oxidizer into the body 310. Oxygen ($O_2$) which has been widely used as an oxidizer is employed as the oxidizer in an embodiment of the present invention.

Figure 10:
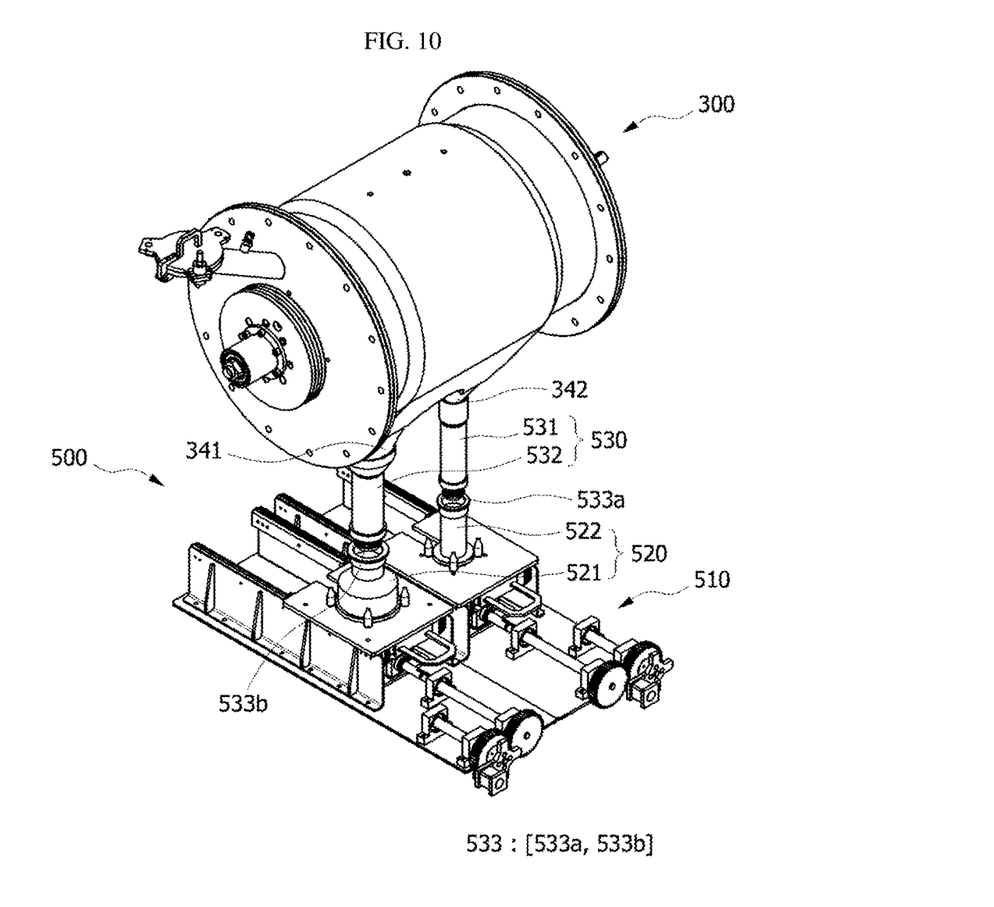
FIG. 10 is a perspective view of a reactor module and a vessel module in a voloxidizer with a double reactor for spent fuel rods decladding according to an embodiment of the present invention.
Figure 11:
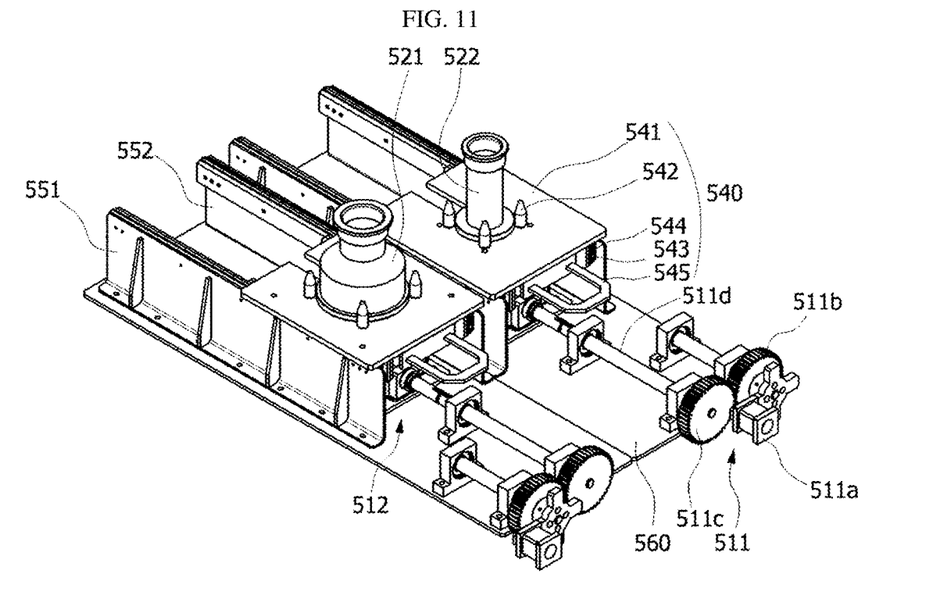
FIG. 11 is a perspective view of a vessel module in a voloxidizer with a double reactor for spent fuel rods decladding according to an embodiment of the present invention.
Figure 12:
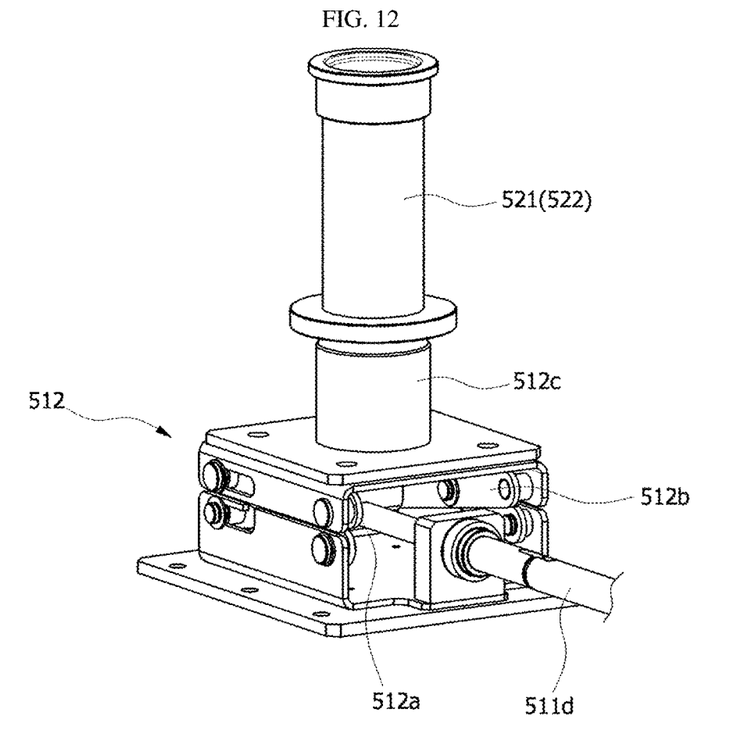
FIG. 12 is a perspective view of a lifting part in a voloxidizer with a double reactor for spent fuel rods decladding according to an embodiment of the present invention.

FIG. 10 to FIG. 12 are perspective views for illustrating the vessel module 500 in the voloxidizer with the double reactor for spent fuel rods decladding according to an embodiment of the present invention.

The vessel module 500 includes a hull vessel 522 for receiving hulls discharged through the discharge part 340, a pellet vessel 521 for receiving pellets, a vessel moving part 510 for moving the vessel 520 toward the discharge part 340, and a vessel guide part 540.

Here, in order to secure an air-tightness, a first cylindrical joint tube 531 and a cylindrical second joint tube 532 are mounted to the discharge part 340, and a first insertion part 533a and a second insertion part 533b, which are inserted into the vessel 520, are formed on one side of a joint tube 530.

It is preferable that a sealing member (not shown) be provided on an insertion part 533 or an inner circumferential surface of an entrance of the vessel 520 to secure a more reliable air-tightness.

The vessel moving part 510 includes a lifting part 512 provided above a vessel moving part support plate 560 and a driving part 511 for generating a driving force for the lifting part 512.

And, the driving part 511 includes a second rotary knob 511a, a second driving gear 511b mounted to the second rotary knob 511a, a second driven gear 511c geared with the second driving gear 511b, and a second drive shaft 511d passing through the second driven gear 511c.

As shown in FIG. 12, the lifting part 512 includes a vessel mounting part 512c on which the vessel 520 is placed and first and second link parts 512a and 512b connected to the second drive shaft 511d. Here, the first and second link parts 512a and 512b are extended and retracted for enabling the vessel mounting part 512c to be moved upward and downward.

The vessel guide part 540 includes a vessel seating plate 541 on which the vessel 520 is placed, and a vessel fixing part 542 for preventing a location of the vessel 520 from being changed when the vessel 520 is slid.

In addition, the vessel guide part 540 further includes a second sliding plate 543 coupled to a lower portion of the vessel seating plate 541 in parallel with the second drive shaft 511d; second sliding guides 544 provided at both sides of the lifting part 512 and mounted to first and second vessel support plates 551 and 552 which are connected and perpendicular to the vessel moving part support plate 560; and a grip 545 connected to one side of the vessel seating plate 541. Here, the second sliding plate 543 is slid on the second sliding guides 544.

Therefore, after the vessel 520 is secured to the vessel fixing part 542, an operator slides the vessel seating plate 541 using the grip 545 to allow the vessel 520 to be placed below the joint tube 530.

Then, the first and second link parts 512a and 512b are extended by an operation of the driving part 511 so that the vessel 520 is attached to the joint tube 530.

Once the vessel 520 is filled with hulls and pellets, the first and second link parts 512a and 512b are retracted by an operation of the driving part 511 so that the vessel 520 is decoupled from the joint tube 530.

Then, the operator slides the vessel seating plate 541 using the grip 545 to collect the vessel 520.

Figure 13:
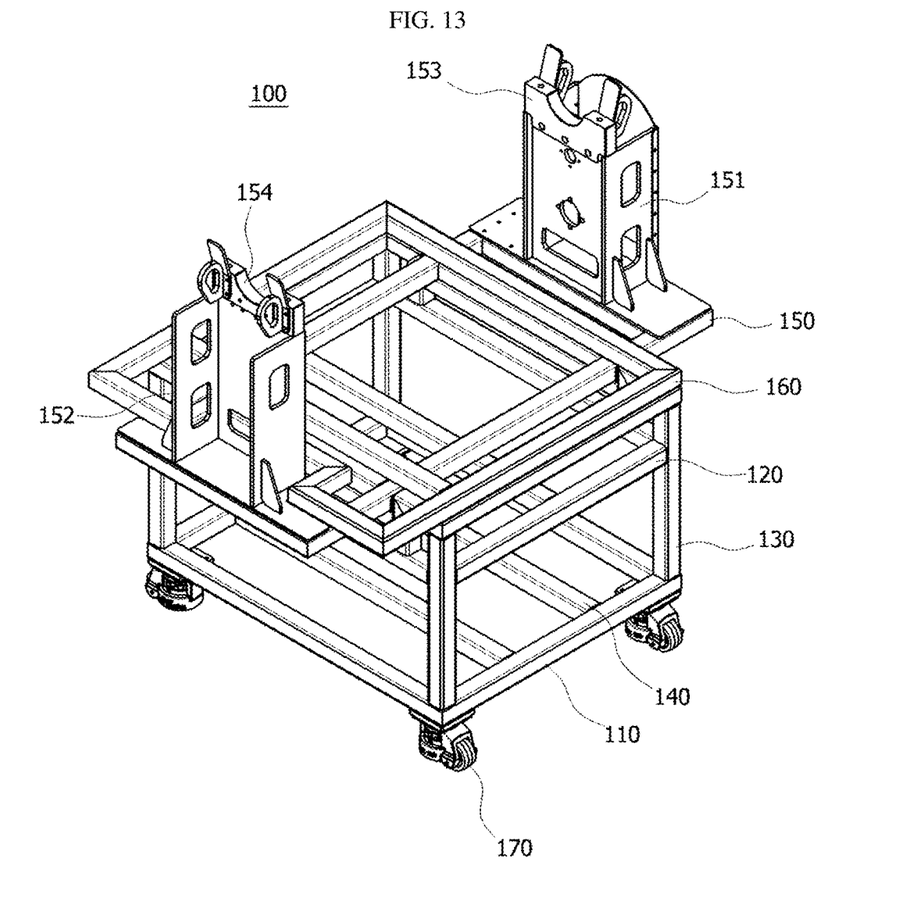
FIG. 13 is a perspective view of a support module in a voloxidizer with a double reactor for spent fuel rods decladding according to an embodiment of the present invention.

FIG. 13 is a perspective view of the support module in the voloxidizer with the double reactor for spent fuel rods decladding according to an embodiment of the present invention. The support module 100 includes rectangular upper and lower frames 120 and 110 formed by connecting a plurality of frames; side frames 130 connected to corner portions of the upper and lower frames 120 and 110; and middle frames connecting the facing upper frames 120 and the facing lower frames 110.

A heater module support frame 160 on which the heating body support plate 270 is placed is placed on the upper frame 120, and a pedestal support frame 150 is placed between the upper frame 120 and the heater module support frame 160.

Here, first and second pedestals 151 and 152 are provided at both longitudinal sides of the pedestal support frame 150 for supporting the rotary shaft 430, and semicircular-shaped first and second rotary shaft pedestal parts 153 and 154, which are concaved inward, are formed on the first and second pedestals 151 and 152, respectively.

A caster 170 is mounted to each corner of the lower frame 110 for allowing the support module 100 to be easily moved.

The voloxidizer with a double reactor for spent fuel rods decladding and the double reactor for use in the same according to an embodiment of the present invention are advantageous in that hulls and pellets separated from the spent fuel rods during the oxidation process for the spent fuel rods can be separately and simultaneously collected so that the collect ratio can be increased.

In addition, due to the double mechanism consisting of the internal reactor and the external reactor, oxidation efficiency of pellets is increased so that stable oxide powders can be obtained.

The remote operation and remote maintenance can be performed by modularization of parts of the device.

The effect obtained by embodiments of the present invention is not limited to the effects mentioned above, and another effect which is not mentioned above may be apparently understood by one skilled in the art through the above detail description.

The embodiments described in the above detailed description and the accompanying drawings only exemplarily describe and illustrate a portion of the technical spirit included in embodiments of the present invention.

Therefore, since the embodiments disclosed in the detailed description do not limit the technical spirit of the present invention, it is obvious that the technical spirit and scope of the present invention is not limited to the embodiments.

While embodiments of the present invention have been described, it will be apparent to those skilled in the art that various changes and modifications may be made without departing from the spirit and scope of the invention as defined in the following claims.

What is claimed is:

1. A double reactor for decladding spent fuel rods, the double reactor comprising;
    a cylindrical drum comprising an inner cylindrical mesh and an outer cylindrical mesh extending along an axis;
    a rotational shaft connected to the cylindrical drum for rotating the cylindrical drum about the axis;
    the inner cylindrical mesh defining an inner reactor;
    the outer cylindrical mesh generally coaxially surrounding the inner cylindrical mesh to define an outer reactor between the inner and outer cylindrical meshes;
    an inner blade formed on an interior surface of the inner cylindrical mesh and spirally extending along the axis; and
    an outer blade formed on an interior surface of the outer cylindrical mesh and spirally extending along the axis,
    wherein when viewing in one of first and second directions, the inner blade is spirally extending in a first rotational direction whereas the outer blade is spirally extending in a second rotational direction that is opposite to the first rotational direction,
    wherein the first and second directions are opposite directions along the axis, and
    wherein the inner reactor is configured to receive spent fuel rods for processing therein, wherein the inner cylindrical mesh is configured to selectively pass particles of processed spent fuel rods to the outer reactor.

2. The double reactor of claim 1, wherein an inner blade's height changes over the axis such that the inner blade's height gradually decreases as the inner blade extends in the first direction of the axis.

3. The double reactor of claim 2, wherein an outer blade's height changes over the axis such that the outer blade's height gradually decreases as the outer blade extends in the second direction of the axis that is opposite to the first direction of the axis.

4. The double reactor of claim 1, wherein the double reactor is configured to rotate about the axis to break the spent fuel rods into smaller pieces within the inner reactor.

5. The double reactor of claim 1, wherein the spent fuel rods comprise hulls and pellets, wherein the double reactor is configured to rotate about the axis to break the spent fuel rods into smaller pieces within the inner reactor such that hulls and pellets are separated.

6. A voloxidizer comprising:
    the double reactor of claim 1;

a heater configured to heat the double reactor; and at least one collector configured to collect particles of spent fuel rods.

7. A method for decladding spent fuel rods, the method comprising:

providing the voloxidizer of claim 6;

supplying spent fuel rods into the inner reactor of the double reactor; and rotating the cylindrical drum of the double reactor in the first rotational direction for a first period while heating the double reactor.

8. The method of claim 7, further comprising:

subsequent to rotating in the first rotational direction, rotating the cylindrical drum of the double reactor in the second rotational direction that is opposite to the first rotational direction; and collecting particles of spent fuel rods, wherein at least part of the particles are oxidized in the double reactor.

9. A voloxidizer comprising:

the double reactor of claim 3;

a heater configured to heat the double reactor; and at least one collector configured to collect particles of spent fuel rods.

10. A method for decladding spent fuel rods, the method comprising:

providing the voloxidizer of claim 9;

supplying spent fuel rods into the inner reactor of the double reactor; and rotating the cylindrical drum of the double reactor in the first rotational direction for a first period while heating the double reactor.

11. The method of claim 10, further comprising:

subsequent to rotating in the first rotational direction, rotating the cylindrical drum of the double reactor in the second rotational direction that is opposite to the first rotational direction; and collecting particles of spent fuel rods, wherein at least part of the particles are oxidized in the double reactor.

\* \* \* \* \*